United States Patent
Tsukamoto et al.

(10) Patent No.: US 10,256,472 B2
(45) Date of Patent: Apr. 9, 2019

(54) CONDUCTIVE PASTE AND MIXTURE PASTE FOR LITHIUM ION BATTERY POSITIVE ELECTRODE

(71) Applicants: KANSAI PAINT CO., LTD., Hyogo (JP); TOYOTA JIDOSHA KABUSHIKI KAISHA, Aichi-ken (JP)

(72) Inventors: Atsushi Tsukamoto, Kanagawa (JP); Junji Akahane, Kanagawa (JP); Koji Endo, Kanagawa (JP); Yoshinori Tochino, Tokyo (JP); Yuta Sarukawa, Kanagawa (JP); Kosuke Iwase, Aichi-ken (JP); Machiko Abe, Aichi-ken (JP); Hideki Hagiwara, Aichi-ken (JP)

(73) Assignees: KANSAI PAINT CO., LTD., Hyogo (JP); TOYOTA JIDOSHA KABUSHIKI KAISHA, Aichi-Ken (JP)

(*) Notice: Subject to any disclaimer, the term of this patent is extended or adjusted under 35 U.S.C. 154(b) by 49 days.

(21) Appl. No.: 15/341,220

(22) Filed: Nov. 2, 2016

(65) Prior Publication Data
US 2017/0141400 A1    May 18, 2017

(30) Foreign Application Priority Data

Nov. 12, 2015 (JP) ................. 2015-221762
Nov. 12, 2015 (JP) ................. 2015-221765

(51) Int. Cl.
| | |
|---|---|
| H01B 1/24 | (2006.01) |
| H01M 4/62 | (2006.01) |
| C09D 5/24 | (2006.01) |
| C09D 125/02 | (2006.01) |
| C09D 133/08 | (2006.01) |
| C09D 133/12 | (2006.01) |
| C09D 133/14 | (2006.01) |
| H01M 4/505 | (2010.01) |
| H01M 4/525 | (2010.01) |
| H01M 10/0525 | (2010.01) |
| H01M 4/04 | (2006.01) |
| C09D 7/61 | (2018.01) |
| H01M 4/02 | (2006.01) |
| H01M 10/052 | (2010.01) |

(52) U.S. Cl.
CPC .............. *H01M 4/625* (2013.01); *C09D 5/24* (2013.01); *C09D 7/61* (2018.01); *C09D 125/02* (2013.01); *C09D 133/08* (2013.01); *C09D 133/12* (2013.01); *C09D 133/14* (2013.01); *H01B 1/24* (2013.01); *H01M 4/0404* (2013.01); *H01M 4/505* (2013.01); *H01M 4/525* (2013.01); *H01M 4/622* (2013.01); *H01M 10/0525* (2013.01); *H01M 10/052* (2013.01); *H01M 2004/028* (2013.01)

(58) Field of Classification Search
CPC .. C09D 125/02; C09D 133/08; C09D 133/12; C09D 133/14; C09D 5/24; C09D 7/1216; H01B 1/24; H01M 10/052; H01M 10/0525; H01M 2004/028; H01M 4/0404; H01M 4/505; H01M 4/525; H01M 4/622; H01M 4/625

See application file for complete search history.

(56) References Cited

U.S. PATENT DOCUMENTS

| | | | |
|---|---|---|---|
| 6,573,004 B1* | 6/2003 | Igarashi .................. | C08L 29/04 429/217 |
| 2012/0177980 A1* | 7/2012 | Iwayasu ................ | C08F 212/32 429/163 |
| 2013/0078514 A1 | 3/2013 | Ohmori et al. | |
| 2013/0224592 A1 | 8/2013 | Iwasaki | |
| 2014/0127563 A1 | 5/2014 | Kim | |
| 2015/0155563 A1 | 6/2015 | Iwasaki | |

FOREIGN PATENT DOCUMENTS

| | | | | |
|---|---|---|---|---|
| EP | 2 641 921 | | 9/2013 | |
| EP | 2 858 150 | | 4/2015 | |
| JP | 11-250915 | | 9/1999 | |
| JP | 2013-89485 | | 5/2013 | |
| JP | 2013235789 A | * | 11/2013 | .............. H01M 4/13 |
| JP | 2014-26868 | | 2/2014 | |
| JP | 2014-193986 | | 10/2014 | |
| JP | 2014-193996 | | 10/2014 | |
| KR | 10-2014-0057936 | | 5/2014 | |
| KR | 10-2015-0123826 | | 11/2015 | |
| WO | WO-2013168544 A1 | * | 11/2013 | .............. H01M 4/13 |

OTHER PUBLICATIONS

Notification of Reason for Refusal dated Nov. 13, 2017 in Korean Application No. 10-2016-0150139, with English translation.
Extended European Search Report dated Feb. 3, 2017 in corresponding European Application No. 16002365.1.

* cited by examiner

*Primary Examiner* — Mark Kopec
*Assistant Examiner* — Jaison P Thomas
(74) *Attorney, Agent, or Firm* — Wenderoth, Lind & Ponack, L.L.P.

(57) ABSTRACT

The present invention provides a conductive paste for positive electrodes of lithium-ion batteries and mixture paste for positive electrodes of lithium-ion batteries that have an easy-to-apply viscosity, even when a relatively small amount of a dispersant is incorporated. More specifically, the present invention provides a conductive paste for positive electrodes of lithium-ion batteries containing a dispersion resin (A), conductive carbon (B), and a solvent (C), the dispersion resin (A) being a copolymer of a monomer mixture comprising a polycyclic aromatic hydrocarbon-containing monomer (A-1) in an amount of 1 to 70 mass %, based on the total solids content.

8 Claims, No Drawings

CONDUCTIVE PASTE AND MIXTURE PASTE FOR LITHIUM ION BATTERY POSITIVE ELECTRODE

CROSS REFERENCE OF RELATED APPLICATION

This application claims priority to JP2015-221762, filed Nov. 12, 2015, and JP2015-221765, filed Nov. 12, 2015, the disclosures of which are incorporated herein by reference in their entirety. The present invention relates to a conductive paste for positive electrodes of lithium-ion batteries and mixture paste for positive electrodes of lithium-ion batteries.

TECHNICAL FIELD

Background Art

A lithium-ion secondary battery is one type of nonaqueous electrolyte secondary battery, and is a secondary battery in which lithium ions in the electrolyte are responsible for electrical conduction. A lithium-ion secondary battery has excellent characteristics, such as high energy density, excellent charged energy-retention characteristics, and a small memory effect, i.e., apparent capacity reduction. Thus, lithium-ion secondary batteries are used in a wide range of fields, such as cellular phones, smartphones, personal computers, hybrid automobiles, and electric automobiles.

A lithium-ion secondary battery mainly comprises a positive-electrode plate, a negative-electrode plate, a separator that insulates the positive- and negative-electrode plates, and a non-aqueous electrolyte solution. The positive-electrode plate is obtained by forming a positive electrode mixture layer on a surface of a positive electrode core. This positive electrode mixture layer may be produced by applying a positive electrode mixture paste to a surface of a positive electrode core, followed by drying. The positive electrode mixture paste is obtained by mixing an electrode active material with a conductive paste containing a conductive auxiliary agent (e.g., carbon), a binder, and a solvent.

As described above, the production of a positive electrode mixture layer is performed by applying a positive electrode mixture paste to a surface of a positive electrode core. Thus, the positive electrode mixture paste, as well as the conductive paste, which is a component of the positive electrode mixture paste, is required to have a low viscosity. Under such circumstances, methods for adding a dispersant (Patent Literature 1 and Patent Literature 2) or an auxiliary agent (Patent Literature 3) to allow a conductive auxiliary agent to be dispersed in a conductive paste or a dispersion liquid are known. A method for using a specific vinyl alcohol-based polymer as a binder is also known (Patent Literature 4). However, a large amount of a dispersant or auxiliary agent affects the battery performance (internal resistance, capacity); thus, the amount thereof used is restricted. Accordingly, a dispersant that is capable, with a small amount thereof, of reducing the viscosity of a conductive paste, has been in demand.

CITATION LIST

Patent Literature

PTL 1: JP2014-26868A
PTL 2: JP2014-193986A
PTL 3: JP2013-89485A
PTL 4: JPH11-250915A

SUMMARY OF INVENTION

Technical Problem

The problem to be solved by the present invention is to provide a conductive paste for positive electrodes of lithium-ion batteries and mixture paste for positive electrodes of lithium-ion batteries that have an easy-to-apply viscosity, even when a relatively small amount of a dispersant is incorporated.

Solution to Problem

Under such circumstances, the present inventors conducted extensive research, and found that the above problem can be solved with the use of a dispersion resin (A) containing a certain amount of a polycyclic aromatic hydrocarbon-containing monomer (A-1). The present invention is accomplished based on such novel findings.

More specifically, the present invention provides the following Items:

Item 1A. A conductive paste for positive electrodes of lithium-ion batteries containing a dispersion resin (A), conductive carbon (B), and a solvent (C),
the dispersion resin (A) being a copolymer of a monomer mixture comprising a polycyclic aromatic hydrocarbon-containing monomer (A-1) in an amount of 1 to 70 mass %, based on the total solids content.

Item 2A. The conductive paste for positive electrodes of lithium-ion batteries according to Item 1A, wherein the conductive carbon (B) comprises acetylene black.

Item 3A. The conductive paste for positive electrodes of lithium-ion batteries according to Item 1A or 2A, wherein the polycyclic aromatic hydrocarbon-containing monomer (A-1) is a naphthyl-containing polymerizable unsaturated monomer or a derivative thereof (A-2).

Item 4A. The conductive paste for positive electrodes of lithium-ion batteries according to any one of Items 1A to 3A, wherein the conductive carbon (B) further comprises graphite.

Item 5A. The conductive paste for positive electrodes of lithium-ion batteries according to any one of Items 1A to 4A, wherein the solvent (C) contains N-methyl-2-pyrrolidone.

Item 6A. A mixture paste for positive electrodes of lithium-ion batteries comprising the conductive paste of any one of Items 1A to 5A, and further comprising an electrode active material.

Item 7A. A method for producing a conductive paste, the method comprising mixing a dispersion resin (A), conductive carbon (B), and a solvent (C),
wherein the dispersion resin (A) is obtained by copolymerization of a monomer mixture comprising a polycyclic aromatic hydrocarbon-containing monomer (A-1) in an amount of 1 to 70 mass %, based on the total solids content.

Item 8A. The method according to Item 7A, wherein the conductive carbon (B) comprises acetylene black.

Item 9A. The method according to Item 7A or 8A, wherein the polycyclic aromatic hydrocarbon-containing monomer (A-1) is a naphthyl-containing polymerizable unsaturated monomer or a derivative thereof (A-2).

Item 10A. The method according to any one of Items 7A to 9A, wherein the conductive carbon (B) further comprises graphite.

Item 11A. The method according to any one of Items 7A to 10A, wherein the solvent (C) contains N-methyl-2-pyrrolidone.

Item 12A. A method for producing a mixture paste for positive electrodes of lithium-ion batteries, the method comprising the steps of:
obtaining a conductive paste by using the method of any one of Items 7A to 11A; and
further mixing an electrode active material with the conductive paste.

Item 13A. An electrode for positive electrodes of lithium-ion batteries obtained by using the mixture paste for positive electrodes of lithium-ion batteries of Item 6A.

Item 14A. A lithium-ion battery having the electrode for positive electrodes of lithium-ion batteries of Item 13A.

Item 1B. A conductive paste for positive electrodes of lithium-ion batteries containing a dispersant (A), a dispersant (D), conductive carbon (B), and a solvent (C),
wherein the dispersant (A) is a copolymer of a monomer mixture comprising a polycyclic aromatic hydrocarbon-containing monomer (A-1) in an amount of 1 to 70 mass %, based on the total solids content, and the dispersant (D) contains a polyvinyl alcohol resin (d1),
the polyvinyl alcohol resin (d1) having a repeating unit represented by the following formula:

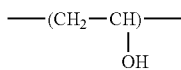

in a proportion of 30 to 100 mass % in polymer chains.

Item 2B. The conductive paste for positive electrodes of lithium-ion batteries according Item 1B, wherein the conductive carbon (B) comprises acetylene black.

Item 3B. The conductive paste for positive electrodes of lithium-ion batteries according to Item 1B or 2B, wherein the polycyclic aromatic hydrocarbon-containing monomer (A-1) is a naphthyl-containing polymerizable unsaturated monomer or a derivative thereof (A-2).

Item 4B. The conductive paste for positive electrodes of lithium-ion batteries according to any one of Items 1B to 3B, wherein the conductive carbon (B) further comprises graphite.

Item 5B. The conductive paste for positive electrodes of lithium-ion batteries according to any one of Items 1B to 4B, wherein the solvent (C) contains N-methyl-2-pyrrolidone.

Item 6B. A mixture paste for positive electrodes of lithium-ion batteries comprising the conductive paste of any one of Items 1B to 5B, and further comprising an electrode active material.

Item 7B. A method for producing a conductive paste, the method comprising mixing a dispersant (A), a dispersant (D), conductive carbon (B), and a solvent (C),
wherein the dispersant (A) is obtained by copolymerization of a monomer mixture comprising a polycyclic aromatic hydrocarbon-containing monomer (A-1) in an amount of 1 to 70 mass %, based on the total solids content, and the dispersant (D) contains a polyvinyl alcohol resin (d1),
the polyvinyl alcohol resin (d1) having a repeating unit represented by the following formula:

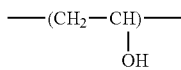

in a proportion of 30 to 100 mass % in polymer chains.

Item 8B. The method according to Item 7B, wherein the conductive carbon (B) comprises acetylene black.

Item 9B. The method according to Item 7B or 8B, wherein the polycyclic aromatic hydrocarbon-containing monomer (A-1) is a naphthyl-containing polymerizable unsaturated monomer or a derivative thereof (A-2).

Item 10B. The method according to any one of Items 7B to 9B, wherein the conductive carbon (B) further comprises graphite.

Item 11B. The method according to any one of Items 7B to 10B, wherein the solvent (C) contains N-methyl-2-pyrrolidone.

Item 12B. A method for producing a mixture paste for positive electrodes of lithium-ion batteries, the method comprising the steps of:
obtaining a conductive paste by using the method of any one of Items 7B to 11B; and
further mixing an electrode active material with the conductive paste.

Item 13B. An electrode for positive electrodes of lithium-ion batteries obtained by using the mixture paste for positive electrodes of lithium-ion batteries of Item 6B.

Item 14B. A lithium-ion battery having the electrode for positive electrodes of lithium-ion batteries of Item 13B.

Advantageous Effects of Invention

The dispersion resin (A) contained in the conductive paste for positive electrodes of lithium-ion batteries and the mixture paste for positive electrodes of lithium-ion batteries of the present invention is, even in a relatively small amount, capable of sufficiently reducing the viscosity of the pastes, compared with resins for pigment dispersion previously used for conductive pastes or mixture pastes for positive electrodes of lithium-ion batteries.

DESCRIPTION OF EMBODIMENTS

In this specification, a dispersion resin (A) may also be referred to as a dispersant (A), and a dispersant (D) may also be referred to as a dispersion resin (D).

Conductive Paste for Positive Electrodes of Lithium-Ion Batteries

The present invention provides a conductive paste for positive electrodes of lithium-ion batteries. This conductive paste contains a dispersion resin (A), conductive carbon (B), and a solvent (C). The dispersion resin (A) is obtained by copolymerization of a monomer mixture comprising a polycyclic aromatic hydrocarbon-containing monomer (A-1) in an amount of 1 to 70 mass %, preferably 5 to 60 mass %, and more preferably 10 to 50 mass %, based on the total solids content of the monomer mixture.

First Embodiment of the Present Invention

The following describes a conductive paste for positive electrodes of lithium-ion batteries according to the present invention, with reference to a first typical embodiment.

Dispersion Resin (A)

A dispersion resin (A) contained in the conductive paste for positive electrodes of lithium-ion batteries of the present invention is characterized in that it is obtained by copolymerization of a monomer mixture comprising a polycyclic aromatic hydrocarbon-containing monomer (A-1) in an amount of 1 to 70 mass %, based on the total solids content of the monomer mixture. Thus, in the present invention, the dispersion resin (A) may be rephrased as a copolymer of a monomer mixture comprising a polycyclic aromatic hydrocarbon-containing monomer (A-1) in an amount of 1 to 70 mass %, based on the total solids content of the monomer mixture.

Examples of the types of the dispersion resin (A) include acrylic resins, polyester resins, epoxy resins, polyether resins, alkyd resins, urethane resins, silicone resins, polycarbonate resins, silicate resins, chlorine-based resins, fluorine-based resins, and composite resins thereof. In particular, acrylic resins are preferable.

In this specification, the term "(meth)acrylate" refers to acrylate and/or methacrylate, and the term "(meth)acrylic acid" refers to acrylic acid and/or methacrylic acid. The term "(meth)acryloyl" refers to acryloyl and/or methacryloyl. The term "(meth)acrylamide" refers to acrylamide and/or methacrylamide. Additionally, in this specification, the term "derivative" refers to a compound obtained by modifying a small portion (or small portions) in the molecule of a compound by functional group introduction, atomic substitution, or other chemical reactions. For example, a compound obtained by introducing one or more functional groups, such as alkyl, alkoxy, hydroxyl, sulfonic acid, carboxyl, amino, nitro, halogen, aryloxy, alkylthio, and arylthio, into naphthalene is referred to as a naphthalene derivative.

Polycyclic Aromatic Hydrocarbon-Containing Monomer (A-1)

Examples of the polycyclic aromatic hydrocarbon in the polycyclic aromatic hydrocarbon-containing monomer (A-1) usable in the dispersion resin of the present invention include a naphthalene ring-, anthracene ring-, triphenylene ring-, tetraphene ring-, tetracene ring-, chrysene ring-, pyrene ring-, pentacene ring-, hexacene ring-, heptacene ring-, coronene ring-, or kekulene ring-containing hydrocarbon group, and derivatives thereof. In a preferable embodiment of the present invention, the polycyclic aromatic hydrocarbon-containing monomer (A-1) may be a polymerizable unsaturated monomer that contains a naphthalene ring-containing hydrocarbon group from among the polycyclic aromatic hydrocarbon groups mentioned above, i.e., a naphthyl-containing polymerizable unsaturated monomer or a derivative thereof (A-2). Examples of the naphthyl-containing polymerizable unsaturated monomer or a derivative thereof (A-2) include a naphthyl-containing polymerizable unsaturated monomer represented by Formula (2) below or a derivative thereof (A-1-2), and the like.

The polycyclic aromatic hydrocarbon-containing monomer (A-1) is preferably a polycyclic aromatic hydrocarbon-containing polymerizable unsaturated monomer (A-1-1) represented by the following Formula (1)

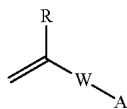

Formula (1)

(wherein R is hydrogen or methyl, A is polycyclic aromatic hydrocarbon, and W may or may not be present; when W is present, W is an organic group having 1 to 20 carbon, nitrogen, and/or oxygen atoms, and when W is not present, W directly binds to A). In the above Formula (1), the phrase "when W is not present" may also be rephrased as "when W is a single bond." Thus, in Formula (1), the phrase "W may or may not be present; when W is present, W is an organic group having 1 to 20 carbon, nitrogen, and/or oxygen atoms, and when W is not present, W directly binds to A" may be rephrased as "W is a single bond or an organic group having 1 to 20 carbon, nitrogen, and/or oxygen atoms."

The "polymerizable unsaturated monomer" refers to a polymerizable unsaturated group-containing monomer that is capable of undergoing radical polymerization. Examples of the polymerizable unsaturated group include (meth)acryloyl, acrylamide, vinyl, allyl, (meth)acryloyloxy, vinyl ether, and the like.

Specific examples of the polycyclic aromatic hydrocarbon-containing polymerizable unsaturated monomer (A-1-1) include vinylnaphthalene, naphthyl(meth)acrylate, naphthyl alkyl(meth)acrylate, vinylanthracene, anthracenyl (meth)acrylate, anthracenyl alkyl(meth)acrylate, vinylpyrene, pyrenyl(meth)acrylate, pyrenyl alkyl(meth) acrylate, vinylchrysene, vinylnaphthalene, vinylpentacene, and derivatives thereof. Examples also include a reaction product obtained by reacting a polymerizable unsaturated monomer containing a reactive functional group, such as glycidyl or isocyanate, with a polycyclic aromatic hydrocarbon group containing a functional group that reacts with such a reactive functional group. Any combination of functional groups is suitably used as long as they react with each other. A more preferable combination includes a combination of a carboxyl group and a glycidyl group, a combination of an amino group and a glycidyl group, and a combination of a hydroxyl group and an isocyanate group. Specific examples include a combination of glycidyl(meth)acrylate and 1-naphthyl acetic acid, a combination of 2-(meth)acryloyloxyethyl isocyanate and 1-naphthol, a combination of 2-(meth)acryloyloxyethyl isocyanate and 1-(2-naphthyl) ethanol, and the like. These may be used alone, or in a combination of two or more.

Of these, the polycyclic aromatic hydrocarbon-containing polymerizable unsaturated monomer (A-1-1) is preferably a naphthyl-containing polymerizable unsaturated monomer represented by the following Formula (2) or a derivative thereof (A-1-2)

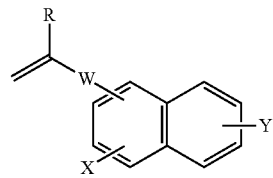

Formula (2)

(wherein R is hydrogen or methyl, X and Y may be identical or different and each represents hydrogen, alkyl, alkoxy, hydroxyl, sulfonic acid, carboxyl, alkoxy carbonyloxy, phosphoryloxy, amino, nitro, halogen, aryloxy, alkylthio, or arylthio; and when W is present, W is an organic group having 1 to 20 carbon, nitrogen, and/or oxygen atoms, or a single bond).

Examples of the naphthyl-containing polymerizable unsaturated monomer or a derivative thereof (A-1-2) include vinylnaphthalene, naphthyl(meth)acrylate, naphthylalkyl (meth)acrylate, derivatives thereof, and the like. These may be used alone, or in a combination of two or more.

Of these, naphthyl(meth)acrylate or a derivative thereof (A-1-2) is preferably naphthyl(meth)acrylate or a derivative thereof (A-1-3) represented by the following Formula (3)

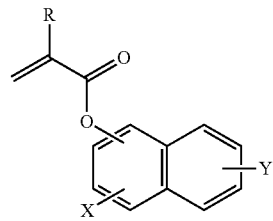

Formula (3)

(wherein R is hydrogen or methyl, and X and Y may be identical or different and each represents hydrogen, alkyl, alkoxy, alkoxycarbonyloxy, phosphoryloxy, hydroxyl, sulfonic acid, carboxyl, amino, nitro, halogen, aryloxy, alkylthio, or arylthio). Examples of the naphthyl(meth)acrylate or a derivative thereof (A-1-3) include 1-naphthyl(meth)acrylate, 2-naphthyl(meth)acrylate, derivatives thereof, and the like. These may be used alone, or in a combination of two or more.

Of these, the naphthyl(meth)acrylate or a derivative thereof (A-1-3) is preferably 4-substituted-1-naphthyl(meth)acrylate (A-1-4) represented by the following Formula (4)

Formula (4)

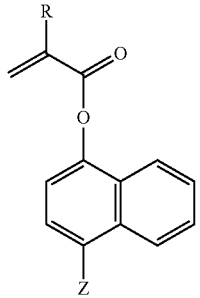

(wherein R is hydrogen or methyl, and Z is hydroxyl, $C_{1-8}$ alkyl, $C_{1-8}$ alkoxy, $C_{1-8}$ alkoxycarbonyloxy, or phosphoryloxy).

Examples of the 4-substituted-1-naphthyl(meth)acrylate (A-1-4) include 4-methyl-1-naphthyl(meth)acrylate, 4-ethyl-1-naphthyl(meth)acrylate, 4-methoxy-1-naphthyl(meth)acrylate, 4-ethoxy-1-naphthyl(meth)acrylate, 4-hydroxy-1-naphthyl(meth)acrylate, 2-methoxy-4-hydroxy-1-naphthyl(meth)acrylate, 2-ethoxy-4-hydroxy-1-naphthyl(meth)acrylate, 2-hydroxy-4-methoxy-1-naphthyl(meth)acrylate, 2-hydroxy-4-ethoxy-1-naphthyl(meth)acrylate, 4-methoxycarbonyloxy-1-naphthyl(meth)acrylate, 4-phenoxycarbonyloxy-1-naphthyl(meth)acrylate, 4-phosphoryloxy-1-naphthyl(meth)acrylate, and derivatives thereof. These may be used alone, or in a combination of two or more.

It is unknown specifically why the polycyclic aromatic hydrocarbon-containing dispersion resin of the present invention is effective in terms of the dispersibility and stability of a pigment. For example, a pigment that has an aromatic ring becomes stable presumably due to π-π interactions between the pigment and dispersion resin. The Π-Π interactions refer to dispersion force between aromatic rings, and are also called stacking interactions since two aromatic rings become stable when disposed as if coins are stacked.

It is unknown specifically why the substituent of the 4-substituted-1-naphthyl(meth)acrylate (A-1-4) is effective in terms of the dispersibility and stability of a pigment. For example, having a substituent presumably increases the electrostatic potential of an aromatic ring, increasing the affinity with a pigment.

Polymerizable Unsaturated Monomers Other than the Polycyclic Aromatic Hydrocarbon-Containing Polymerizable Unsaturated Monomer (A-1)

The dispersion resin (A) of the present invention is obtained by copolymerization of the polycyclic aromatic hydrocarbon-containing polymerizable unsaturated monomer (A-1) and a polymerizable unsaturated monomer other than (A-1). The polymerizable unsaturated monomer other than the polycyclic aromatic hydrocarbon-containing polymerizable unsaturated monomer (A-1) is not particularly limited as long as it is usually used in the synthesis of acrylic resin. Examples include alkyl (meth)acrylates of 3 carbon atoms or less, such as methyl (meth)acrylate, ethyl (meth)acrylate, n-propyl (meth)acrylate, and isopropyl (meth)acrylate; alkyl or cycloalkyl (meth)acrylates, such as n-butyl (meth)acrylate, i-butyl (meth)acrylate, t-butyl (meth)acrylate, n-hexyl (meth)acrylate, octyl (meth)acrylate, 2-ethylhexyl (meth)acrylate, nonyl (meth)acrylate, tridecyl (meth)acrylate, lauryl (meth)acrylate, stearyl (meth)acrylate, isostearyl (meth)acrylate, cyclohexyl (meth)acrylate, methylcyclohexyl (meth)acrylate, t-butylcyclohexyl (meth)acrylate, cyclododecyl (meth)acrylate, and tricyclodecanyl (meth)acrylate;

isobornyl-containing polymerizable unsaturated compounds, such as isobornyl (meth)acrylate;

adamantyl-containing polymerizable unsaturated compounds, such as adamantyl (meth)acrylate;

aromatic-ring-containing polymerizable unsaturated monomers, such as benzyl (meth)acrylate, styrene, α-methylstyrene, and vinyltoluene;

hydroxy-containing polymerizable unsaturated monomers, such as monoesterified products of (meth)acrylic acids with dihydric alcohols having 2 to 8 carbon atoms (such as 2-hydroxyethyl(meth)acrylate, 2-hydroxypropyl(meth)acrylate, 3-hydroxypropyl(meth)acrylate, and 4-hydroxybutyl (meth)acrylate), ε-caprolactone-modified compounds of these monoesterified products of (meth)acrylic acids with dihydric alcohols having 2 to 8 carbon atoms, N-hydroxymethyl(meth)acrylamide, allyl alcohol, and (meth)acrylates having hydroxy-terminated polyoxyalkylene chains;

carboxy-containing polymerizable unsaturated monomers, such as (meth)acrylic acid, maleic acid, crotonic acid, and β-carboxyethyl acrylate;

nitrogen-containing polymerizable unsaturated monomers having no urethane bond, such as (meth)acrylonitrile, (meth)acrylamide, N,N-dimethylaminoethyl (meth)acrylate, N,N-diethylaminoethyl (meth)acrylate, N,N-dimethylaminopropyl (meth)acrylamide, (meth)acrylamide compounds, and addition products of glycidyl (meth)acrylate with amines;

urethane bond-containing polymerizable unsaturated monomers, such as a reaction product of an isocyanate-containing polymerizable unsaturated monomer and a hydroxy-containing compound, and a reaction product of a hydroxy-containing polymerizable unsaturated monomer and an isocyanate-containing compound;

epoxy-containing polymerizable unsaturated monomers, such as glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate, and allyl glycidyl ether;

(meth)acrylates having alkoxy-terminated polyoxyethylene chains;

sulfonic acid group-containing polymerizable unsaturated monomers, such as 2-acrylamido-2-methylpropane-sulfonic acid, 2-sulfoethyl (meth)acrylate, allylsulfonic acid, and 4-styrenesulfonic acid, and sodium salts and ammonium salts of these sulfonic acids;

phosphoric acid group-containing polymerizable unsaturated monomers, such as 2-acryloyloxyethyl acid phosphate, 2-methacryloyloxyethyl acid phosphate, 2-acryloyloxypropyl acid phosphate, and 2-methacryloyloxypropyl acid phosphate;

alkoxysilyl-containing polymerizable unsaturated monomers, such as vinyltrimethoxysilane, vinyltriethoxysilane, vinyltris(2-methoxyethoxy)silane, γ-(meth)acryloyloxypropyltrimethoxysilane, and γ-(meth)acryloyloxypropyltriethoxysilane;

perfluoroalkyl (meth)acrylates, such as perfluorobutylethyl (meth)acrylate, and perfluorooctylethyl (meth)acrylate;

fluorinated alkyl-containing polymerizable unsaturated monomers, such as fluoroolefins;

polymerizable unsaturated monomers having a photo-polymerizable functional group, such as maleimide;

(meth)acrylates having alkoxy-terminated polyoxyethylene chains;

polymerizable unsaturated monomers having two or more polymerizable unsaturated groups per molecule, such as allyl (meth)acrylate, ethylene glycol di(meth)acrylate, triethylene glycol di(meth)acrylate, tetraethylene glycol di(meth)acrylate, 1,3-butylene glycol di(meth)acrylate, trimethylol propane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tetra(meth)acrylate, glycerol di(meth)acrylate, 1,1,1-trishydroxymethylethane di(meth)acrylate, 1,1,1-trishydroxymethylethane tri(meth)acrylate, 1,1,1-trishydroxymethylpropane tri(meth)acrylate, triallyl isocyanurate, diallyl terephthalate, and divinylbenzene; and the like.

These may be used alone, or in a combination of two or more.

Of these, it is preferable to contain at least one styrene, and it is more preferable to contain styrene in an amount of 5 to 65 mass %, based on the total amount of the polymerizable unsaturated monomer components.

To form a steric repelling layer of the resin and achieve dispersion paste stability, it is preferable to contain at least one polyalkylene glycol macromonomer, and it is more preferable to contain polyalkylene glycol macromonomer in an amount of 1 to 30 mass %, based on the total amount of the polymerizable unsaturated monomer components. The polyalkylene glycol macromonomer is a nonionic polymerizable unsaturated monomer represented by the following formula (5). Specific examples of such a monomer include polyethylene glycol (meth)acrylate, polypropylene glycol (meth)acrylate, methoxy polyethylene glycol(meth)acrylate, ethoxypolyethylene glycol(meth)acrylate, and the like. Of these, in particular, polyethylene glycol(meth)acrylate and polypropylene glycol(meth)acrylate are preferable.

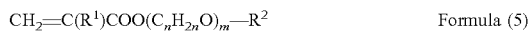

$$CH_2=C(R^1)COO(C_nH_{2n}O)_m-R^2 \quad \text{Formula (5)}$$

(wherein $R^1$ is hydrogen or methyl, $R^2$ is hydrogen or $C_{1-4}$ alkyl, m is an integer of 4 to 60, in particular 4 to 55, and n is an integer of 2 to 3; in the formula, m-number of oxyalkylene units $(C_nH_{2n}O)$ may be the same or different.)

It is also preferable to contain at least one (meth)acrylamide compound. As the (meth)acrylamide compound, known compounds may be used without particular limitation. Specific examples include acrylamide, methacrylamide, 2-acrylamide-2-methylpropanesulfonic acid, N-methylacrylamide, N-methylmethacrylamide, N-methylol acrylamide butyl ether, N-methylol methacrylamide butyl ether, N-ethylacrylamide, N-ethylmethacrylamide, N-n-propylacrylamide, N-n-propylmethacrylamide, N-isopropylacrylamide, N-isopropylmethacrylamide, N-cyclopropylacrylamide, N-cyclopropylmethacrylamide, diacetone acrylamide, diacetone methacrylamide, N-hydroxymethylacrylamide, N-hydroxymethylmethacrylamide, N-hydroxyethylacrylamide, N-hydroxypropyl acrylamide, N-hydroxybutyl acrylamide, N-hydroxypentyl acrylamide, N-hydroxymethyl-N-ethyl acrylamide, N-methyl-N-hydroxyethyl acrylamide, N,N-dihydroxymethyl acrylamide, N,N-dihydroxyethyl acrylamide, N,N-dihydroxypropyl acrylamide, N,N-dihydroxybutyl acrylamide, N,N-dihydroxypentyl acrylamide, N-hydroxymethyl methacrylamide, N-hydroxyethyl methacrylamide, N-hydroxypropyl methacrylamide, N-hydroxybutyl methacrylamide, N-hydroxypentyl methacrylamide, N-hydroxymethyl-N-ethyl methacrylamide, N-methyl-N-hydroxyethyl methacrylamide, N,N-dihydroxymethyl methacrylamide, N,N-dihydroxyethyl methacrylamide, N,N-dihydroxypropyl methacrylamide, N,N-dihydroxybutyl methacrylamide, N,N-dihydroxypentyl methacrylamide, N,N-dihydroxybutyl (meth)acrylamide, and N-[tris(hydroxymethyl)methyl]acrylamide, N,N-dimethylacrylamide, N,N-dimethylmethacrylamide, N,N-diethylacrylamide, diethylmethacrylamide, N-methyl-N-ethylacrylamide, N-methyl-N-ethylmethacrylamide, N-methylol acrylamide methyl ether, N-methylol methacrylamide methyl ether, N-methylol acrylamide ethyl ether, N-methylol methacrylamide ethyl ether, N-methylol acrylamide propyl ether, N-methylol methacrylamide propyl ether, N-methylol acrylamide butyl ether, N-methylol methacrylamide butyl ether, N,N-dimethylaminoethyl (meth)acrylamide, N,N-dimethylaminopropyl (meth)acrylamide, N,N-diethylaminoethyl (meth)acrylamide, N,N-dipropylaminoethyl (meth)acrylamide, and like amino-containing (meth)acrylamide compounds, methacryloyloxyethyl trimethyl ammonium chloride (Acryester DMC, trade name, produced by Mitsubishi Rayon Co., Ltd.) and like quaternary-ammonium-base-containing acrylamide compounds, acryloyl morpholine, and the like. These may be used alone, or in a combination of two or more.

Of these, it is preferable to use a (meth)acrylamide compound represented by the following formula (6):

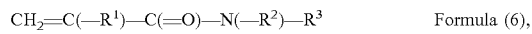

$$CH_2=C(-R^1)-C(=O)-N(-R^2)-R^3 \quad \text{Formula (6)},$$

$R^1$ in Formula (6) is hydrogen or methyl, $R^2$ and $R^3$ may be identical or different and each may preferably be at least one member selected from a hydrogen atom, hydroxy-containing organic group, or alkyl group. Further, it is more preferable that both or one of $R^2$ and $R^3$ represent a hydroxy-containing organic group. Specifically, for example, at least one member selected from N-hydroxymethyl(meth)acrylamide, N-hydroxyethyl(meth)acrylamide, hydroxypropyl(meth)acrylamide, N-hydroxybutyl(meth)acrylamide, hydroxymethyl-N-ethyl(meth)acrylamide, N-methyl-N-hydroxyethyl(meth)acrylamide, N-ethyl-N-hydroxyethyl(meth)acrylamide, hydroxyethyl-N-butyl(meth)acrylamide, N-hydroxybutyl-N-butyl (meth)acrylamide, N,N-dihydroxymethyl (meth)acrylamide, N,N-dihydroxyethyl(meth)acrylamide, N,N-dihydroxypropyl(meth)acrylamide, N,N-dihydroxybutyl(meth)acrylamide, or N-[tris(hydroxymethyl)methyl]acrylamide is particularly preferable.

Synthesis of Dispersion Resin (A)

The dispersion resin (A) contained in the conductive paste for positive electrodes of lithium-ion batteries of the present invention may be obtained by a known radical-polymerization method, such as solution polymerization in an organic solvent in the presence of a radical polymerization initiator, or emulsion polymerization in an aqueous medium in the presence of a radical polymerization initiator.

Examples of radical polymerization initiators used in polymerization include cyclohexanone peroxide, 3,3,5-trimethylcyclohexanone peroxide, methylcyclohexanone peroxide, 1,1-bis(tert-butylperoxy)-3,3,5-trimethylcyclohexane, 1,1-bis(tert-butylperoxy)cyclohexane, n-butyl-4,4-bis(tert-butylperoxy)valerate, cumenehydro peroxide, 2,5-dimethylhexane-2,5-dihydroperoxide, 1,3-bis(tert-butylperoxy-m-isopropyl)benzene, 2,5-dimethyl-2,5-di(tert-butylperoxy) hexane, diisopropylbenzene peroxide, tert-butylcumyl peroxide, decanoyl peroxide, lauroyl peroxide, benzoyl peroxide, 2,4-dichlorobenzoyl peroxide, di-tert-amyl peroxide, bis(tert-butylcyclohexyl)peroxydicarbonate, tert-butylperoxy benzoate, 2,5-dimethyl-2,5-di(benzoylperoxy)hexane, tert-butyl peroxy-2-ethylhexanoate, and like peroxide-based polymerization initiators; and 2,2'-azobis(isobutyronitrile), 1,1-azobis(cyclohexane-1-carbonitrile), azocumene, 2,2'-azobis(2-methylbutyronitrile), 2,2'-azobis dimethylvaleronitrile, 4,4'-azobis(4-cyanovaleric acid), 2-(t-butylazo)-2-cyanopropane, 2,2'-azobis(2,4,4-trimethylpentane), 2,2'-azobis (2-methylpropane), dimethyl 2,2'-azobis(2-methylpropionate), and like azo-based polymerization initiators. These may be used alone, or in a combination of two or more.

The solvents used in the above polymerization or dilution are not particularly limited, and water, an organic solvent, and a mixture thereof may be used. Examples of organic solvents include hydrocarbon solvents, such as n-butane, n-hexane, n-heptane, n-octane, cyclopentane, cyclohexane, and cyclobutane; aromatic-based solvents, such as toluene and xylene; ketone-based solvents, such as methyl isobutyl ketone; ether-based solvents, such as n-butyl ether, dioxane, ethylene glycol monomethyl ether, ethylene glycol monoethyl ether, ethylene glycol monoethyl ether, ethylene glycol monobutyl ether, and diethylene glycol; ester-based solvents, such as ethyl acetate, n-butyl acetate, isobutyl acetate, ethylene glycol monomethyl ether acetate, and butylcarbitol acetate; ketone-based solvents, such as methyl ethyl ketone, methyl isobutyl ketone, and diisobutyl ketone; alcohol-based solvents, such as ethanol, isopropanol, n-butanol, sec-butanol, and isobutanol; amide-based solvents, such as Equamide (trade name, produced by Idemitsu Kosan Co., Ltd., amide-based solvent), N,N-dimethylformamide, dimethylacetamide, N-methylformamide, N-methylacetamide, N-methylpropionamide, N-methyl-2-pyrrolidone; and other known solvents. These may be used alone, or in a combination of two or more.

In solution polymerization in an organic solvent, for example, a method comprising mixing a polymerization initiator, polymerizable unsaturated monomer components, and an organic solvent, and performing heating while stirring may be used; as well as a method comprising introducing an organic solvent in a reaction vessel to prevent an increase in the temperature of the system due to the reaction heat, and adding polymerizable unsaturated monomer components and a polymerization initiator dropwise separately or in combination over a predetermined time with stirring at a temperature of 60 to 200° C. while optionally blowing an inert gas, such as nitrogen and argon.

In general, polymerization may be performed for about 1 to 10 hours. After polymerization of each step, an additional catalyst step may also be performed that comprises heating a reaction vessel, while optionally adding a polymerization initiator dropwise.

The dispersion resin of the present invention obtained as above has a weight average molecular weight within a range of preferably 1,000 to 100,000, and more preferably 3,000 to 50,000.

After the completion of the synthesis, the dispersion resin (A) may be subjected to solvent removal and/or solvent replacement to obtain a solid or a resin solution whose solvent has been replaced with an arbitrary solvent. The replacement solvent is preferably N-methyl-2-pyrrolidone, N-ethyl-2-pyrrolidone, propylene glycol monomethyl ether, methanol, water, and the like. The method for solvent removal may be performed by heating at ordinary pressure. Solvent removal may also be performed under reduced pressure. For solvent replacement, a replacement solvent may be introduced at any step of before, during, or after solvent removal.

In this specification, the number average molecular weight and weight average molecular weight are a polystyrene equivalent molecular weight that is determined from the retention time (retention volume) measured by gel permeation chromatography (GPC) based on the retention time (retention volume) of a standard polystyrene with a known molecular weight measured under the same conditions. More specifically, the measurement is performed using a gel permeation chromatography apparatus (HLC8120GPC (trade name) produced by Tosoh Corporation) together with four columns (TSKgel G-4000HXL, TSKgel G-3000HXL, TSKgel G-2500HXL, and TSKgel G-2000XL, trade names, all produced by Tosoh Corporation) under the following conditions: mobile phase: tetrahydrofuran; measurement temperature: 40° C.; flow rate: 1 mL/min; and detector: RI.

Conductive Carbon (B)

Examples of the conductive carbon (B) include acetylene black, furnace black, thermal black, channel black, Ketjen black, Vulcan, carbon nanotube, graphene, vapor growth carbon fiber (VGCF), graphite, and the like, with acetylene black, graphite, and the like being preferable, and acetylene black and the like being more preferable. In a preferable embodiment of the present invention, the conductive carbon (B) may comprise both acetylene black and graphite. These conductive carbon materials may be used alone, or in a combination of two or more.

Solvent (C)

As the solvent (C), the solvents mentioned above that are used for polymerization of the dispersion resin or dilution may be suitably used. Specific preferable examples of the solvent (C) include N-methyl-2-pyrrolidone, N-ethyl-2-pyrrolidone, propylene glycol monomethyl ether, methanol, water, and the like, with N-methyl-2-pyrrolidone being preferable. These solvents may be used alone, or in a combination of two or more.

Other Additives

The conductive paste for positive electrodes of lithium-ion batteries may contain components other than the above components (A), (B), and (C) (sometimes referred to as "other additives"). Examples of the other additives include a neutralizing agent, a pigment dispersant, a defoaming agent, an antiseptic agent, an anti-rust agent, a plasticizer, a binding agent (binder), and the like.

Examples of pigment dispersants and/or binding agents include acrylic resins, polyester resins, epoxy resins, polyether resins, alkyd resins, urethane resins, silicone resins, polycarbonate resins, silicate resins, chlorine-based resins, fluorine-based resins, polyvinylpyrrolidone resins, polyvinyl alcohol resins, polyvinyl acetal resins, composite resins thereof, and the like, other than the above dispersion resin (A). These resins may be used alone, or in a combination of two or more. Of these, polyvinylidene fluoride (PVDF) is preferably used.

Further, the conductive paste for positive electrodes of lithium-ion batteries may optionally contain an acidic compound. The acidic compound is not particularly limited, and any of inorganic acids and organic acids may be used. Examples of inorganic acids include hydrochloric acid, sulfuric acid, nitrate, phosphate, and the like. Examples of organic acids include carboxylic acid compounds, sulfonic acid compounds, and the like. Examples of carboxylic acid compounds include formic acid, acetic acid, propionic acid, butyric acid, tartaric acid, oxalic acid, malonic acid, succinic acid, glutaric acid, adipic acid, pimelic acid, suberic acid, (meth)acrylic acid, crotonic acid, fumaric acid, maleic acid, itaconic acid, citraconic acid, fluoroacetic acid, and the like. Examples of sulfonic acid compounds include methanesulfonic acid, para-toluenesulfonic acid, dodecylbenzenesulfonic acid, dinonylnaphthalenesulfonic acid, dinonylnaphthalenedisulfonic acid, and the like. In addition to the above, anhydrides or hydrates of these acidic compounds, or an acidic compound in which a portion is a salt form may also be used. These may be used alone, or in a combination of two or more.

Method for Producing a Conductive Paste for Positive Electrodes of Lithium-Ion Batteries The solids content of the dispersion resin (A) in the solids content of the conductive paste for positive electrodes of lithium-ion batteries of the present invention is usually 30 mass % or less, and preferably 20 mass % or less, in view of the viscosity at the time that the pigment is dispersed, as well as pigment dispersibility, dispersion stability, and production efficiency. Further, in a preferable embodiment of the present invention, from the viewpoint of the conductivity of a coating film, the amount of the dispersion resin (A) contained in the solids content of the conductive paste for positive electrodes of lithium-ion batteries of the present invention is usually 20 mass % or less, preferably 0.1 to 15 mass %, and more preferably 1.0 to 10 mass %.

The solids content of the conductive carbon (B) in the solids content of the conductive paste for positive electrodes of lithium-ion batteries of the present invention is usually 50 mass % or more and less than 100 mass %, preferably 60 mass % or more and less than 100 mass %, and more preferably 70 mass % or more and less than 100 mass %, in view of the battery performance. Further, the amount of the solvent (C) contained in the conductive paste for positive electrodes of lithium-ion batteries of the present invention is usually 50 mass % or more and less than 100 mass %, preferably 70 mass % or more and less than 100 mass %, and more preferably 80 mass % or more and less than 100 mass %, in view of the drying efficiency and paste viscosity.

The conductive paste for positive electrodes of lithium-ion batteries of the present invention may be produced by uniformly mixing and dispersing each component described above by using, for example, a known dispersion device, such as a paint shaker, a sand mill, a ball mill, a pebble mill, an LMZ mill, a DCP pearl mill, a planetary ball mill, a homogenizer, a twin-screw kneader, and a thin-film spin system high-speed mixer.

Second Embodiment of the Present Invention

The following describes a conductive paste for positive electrodes of lithium-ion batteries according to the present invention, with reference to a second preferable embodiment. In the second embodiment, the present invention provides a conductive paste for positive electrodes of lithium-ion batteries containing a dispersant (A), a dispersant (D), conductive carbon (B), and a solvent (C). The dispersant (A) is obtained by copolymerization of a monomer mixture comprising a polycyclic aromatic hydrocarbon-containing monomer (A-1) in an amount of 1 to 70 mass %, preferably 5 to 60 mass %, and more preferably 10 to 50 mass %, based on the total solids content, and the dispersant (D) contains a polyvinyl alcohol resin (d1), which has a repeating unit represented by the following formula:

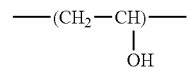

in a proportion of 30 to 95 mass % in the polymer chains.

Dispersant (A)

In the second embodiment of present invention, the dispersant (A) may be the same as those described above in the "Dispersion Resin (A)" in the "First Embodiment of the Present Invention" section.

In the second embodiment, naphthyl(meth)acrylate or a derivative thereof (A-1-3) is preferably 4-substituted-1-naphthyl(meth)acrylate (A-1-4) represented by the following Formula (4)

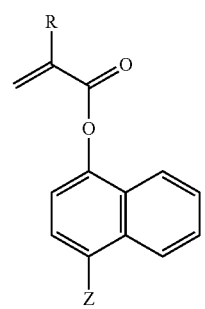

Formula (4)

(wherein R is hydrogen or methyl, and Z is hydroxyl or $C_{1-8}$ alkoxy).

When Z, which is a substituent in Formula (4) above, is alkoxy, the carbon number of the alkoxy group is usually 1 to 8, preferably 1 to 4, more preferably 1 to 2, and particularly preferably 1.

Dispersant (D)

The dispersant (D) used in the conductive paste of the present invention contains a polyvinyl alcohol resin (d1) other than the dispersant (A).

Polyvinyl Alcohol Resin (d1)

The polyvinyl alcohol resin (d1) usable in the present invention is characterized in that it has a repeating unit represented by the following formula in a proportion of usually 30 to 100 mass %, and preferably 30 to 95 mass %, in the polymer chains. The proportion of the repeating units may be calculated based on the amount of the monomers constituting the resin and saponification degree.

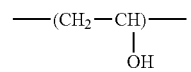

The polyvinyl alcohol resin (d1) above may be obtained by a known polymerization method, for example, by polymerization of a fatty acid vinyl ester represented by vinyl acetate, followed by hydrolyzation.

Examples of the fatty acid vinyl esters include vinyl formate, vinyl acetate, vinyl propionate, vinyl butyrate, vinyl caprate, vinyl laurate, vinyl palmitate, vinyl stearate, and other linear or branched saturated fatty acid vinyl esters, with vinyl acetate being preferable.

The polyvinyl alcohol resin above may also be obtained by copolymerization with a polymerizable unsaturated monomer other than fatty acid vinyl esters.

Examples of polymerizable unsaturated monomers that are capable of being copolymerized with a fatty acid vinyl ester include olefins, such as ethylene and propylene; (meth) acryloyl group-containing monomers, such as alkyl (meth)acrylate, 2-hydroxyethyl (meth)acrylate, and glycidyl (meth)acrylate; allyl ethers, such as allyl glycidyl ether; halogenated vinyl compounds, such as vinyl chloride, vinylidene chloride, and vinyl fluoride; vinyl ethers, such as alkyl vinyl ether and 4-hydroxyvinyl ether; and the like. These may be used alone, or in a combination of two or more.

The following describes the present invention, mainly referring to vinyl acetate; however, the present invention is not limited thereto.

Polymerization to obtain a polyvinyl alcohol resin may be performed by known polymerization methods. For example, a polyvinyl alcohol resin may be produced by subjecting vinyl acetate to solution polymerization in an alcohol-based organic solvent to produce polyvinyl acetate, followed by saponification thereof. The methods are not limited to the above, and, for example, bulk polymerization, emulsion polymerization, suspension polymerization, or the like is also applicable. In solution polymerization, either continuous polymerization or batch polymerization may be performed, monomers may be added all at once or in divided portions, and the addition may be performed successively or intermittently.

The polymerization initiator used in solution polymerization is not particularly limited. The following known radical polymerization initiators may be used:
azo compounds, such as azobisisobutyronitrile, azobis-2,4-dimethylvaleronitrile, and azobis(4-methoxy-2,4-dimethylvaleronitrile); peroxides, such as acetyl peroxide, benzoyl peroxide, lauroyl peroxide, acetylcyclohexylsulfonyl peroxide, and 2,4,4-trimethylpentyl-2-peroxyphenoxyacetate; percarbonate compounds, such as diisopropyl peroxydicarbonate, di-2-ethylhexyl peroxydicarbonate, and diethoxyethyl peroxydicarbonate; perester compounds, such as t-butylperoxy neodecanoate, α-cumylperoxy neodecanoate, and t-butylperoxy neodecanoate;
azobis dimethylvaleronitrile; azobis methoxyvaleronitrile; and the like.

The polymerization reaction temperature is not particularly limited, and may be usually determined within a range of about 30 to 150° C.

The saponification conditions in the production of polyvinyl alcohol resin are not particularly limited, and saponification may be performed by a known method. In general, saponification may be performed by hydrolyzing an ester moiety in a molecule in an alcohol solution, such as methanol, in the presence of an alkali catalyst or an acid catalyst.

The alkali catalyst may be, for example, an alkali metal hydroxide, such as sodium hydroxide, potassium hydroxide, sodium methylate, sodium ethylate, and potassium methylate; alcoholate; and the like. The acid catalyst may be, for example, an aqueous solution of an inorganic acid, such as hydrochloric acid and sulfuric acid; and an organic acid, such as p-toluenesulfonic acid. It is desirable to use sodium hydroxide. The saponification reaction temperature is not particularly limited, and is preferably within a range of 10 to 70° C., and more preferably 30 to 40° C. The reaction time is not particularly limited, and is desirably within a range of 30 minutes to 3 hours.

The thus-obtained polyvinyl alcohol resin preferably has a polymerization degree of 100 to 4,000, and more preferably 100 to 3,000. Further, the saponification degree is preferably 50 to 100 mol %, more preferably 60 to 95 mol %, and still more preferably 70 to 90 mol %. In the present invention, the saponification degree of polyvinyl alcohol resin refers to the percentage (mol %) of hydrolyzed ester bond in the structural units derived from fatty acid vinyl ester contained in the polyvinyl alcohol resin. In the present invention, the saponification degree may be measured by completely saponifying a polyvinyl alcohol resin with an alkaline substance, such as sodium hydroxide, and measuring the amount of the obtained fatty acid salt (e.g., acetate salt) (whether saponification is perfectly completed may be confirmed by infrared absorption spectrometry).

The polyvinyl alcohol resin above may be a commercially available product.

After the completion of the synthesis, the polyvinyl alcohol resin (d1) may be subjected to solvent removal and/or solvent replacement to obtain a solid or a resin solution whose solvent has been replaced with an arbitrary solvent. The replacement solvent is preferably N-methyl-2-pyrrolidone, N-ethyl-2-pyrrolidone, propylene glycol monomethyl ether, methanol, water, and the like. The method for solvent removal may be performed by heating at ordinary pressure. Solvent removal may also be performed under reduced pressure. For solvent replacement, a replacement solvent may be introduced at any step of before, during, or after solvent removal.

The solids content of the polyvinyl alcohol resin (d1) in the resin solids content of the dispersant (D) is not particularly limited, and may be suitably determined within a range of, for example, 0.1 to 100 mass %, and preferably 50 to 100 mass %.

Resins Other than Dispersant (A) and Polyvinyl Alcohol Resin (d1)

The dispersant (D) may optionally contain a resin other than the dispersant (A) and polyvinyl alcohol resin (d1). Examples of resins other than the polyvinyl alcohol resin (d1) include acrylic resins, polyester resins, epoxy resins, polyether resins, alkyd resins, urethane resins, silicone resins, polycarbonate resins, silicate resins, chlorine-based resins, fluorine-based resins, polyvinylpyrrolidone resins, polyvinyl alcohol resin, polyvinyl acetal resin, composite resins thereof, and the like, other than the polyvinyl alcohol resin (d1). These resins may be used alone, or in a combination of two or more. Of these, a combined use with at least one resin selected from polyvinyl acetal resins, polyvinylpyrrolidone resins, polyvinyl alcohol resins, or fluororesins is preferable, and a combined use with polyvinylidene fluoride (PVDF) is more preferable. These resins may be incorporated into a conductive paste as a resin for pigment dispersion or as a resin added after pigment dispersion.

Conductive Carbon (B)

In the second embodiment of the present invention, the conductive carbon (B) may be the same as those described above in the "Conductive Carbon (B)" in the "First Embodiment of the Present Invention" section.

Solvent (C)

In the second embodiment of present invention, the solvent (C) may be the same as those described in the "Solvent (C)" in the "First Embodiment of the Present Invention."

Other Additives

In the second embodiment of the present invention as well, the conductive paste for positive electrodes of lithium-ion batteries may contain components other than the above components (A), (B), (C), and (D) (sometimes referred to as "other additives"). Examples of the other additives include a neutralizing agent, a pigment dispersant, a defoaming agent, an antiseptic agent, an anti-rust agent, a plasticizer, a binding agent (binder), and the like.

Examples of pigment dispersants and/or binding agents include acrylic resins, polyester resins, epoxy resins, polyether resins, alkyd resins, urethane resins, silicone resins, polycarbonate resins, silicate resins, chlorine-based resins, fluorine-based resins, polyvinylpyrrolidone resins, polyvinyl alcohol resins, polyvinyl acetal resins, composite resins thereof, and the like, other than the dispersants (A) and (D) above. These resins may be used alone, or in a combination of two or more. Of these, polyvinylidene fluoride (PVDF) is preferably used.

Further, the conductive paste for positive electrodes of lithium-ion batteries may optionally contain an acidic compound. The acidic compound is not particularly limited, and any of inorganic acids and organic acids may be used. Examples of inorganic acids include hydrochloric acid, sulfuric acid, nitrate, phosphate, and the like. Examples of organic acids include carboxylic acid compounds, sulfonic acid compounds, and the like. Examples of carboxylic acid compounds include formic acid, acetic acid, propionic acid, butyric acid, tartaric acid, oxalic acid, malonic acid, succinic acid, glutaric acid, adipic acid, pimelic acid, suberic acid, (meth)acrylic acid, crotonic acid, fumaric acid, maleic acid, itaconic acid, citraconic acid, fluoroacetic acid, and the like. Examples of sulfonic acid compounds include methanesulfonic acid, para-toluenesulfonic acid, dodecylbenzenesulfonic acid, dinonylnaphthalenesulfonic acid, dinonylnaphthalenedisulfonic acid, and the like. In addition to the above, anhydrides or hydrates of these acidic compounds, or an acidic compound in which a portion is a salt form may also be used. These may be used alone, or in a combination of two or more.

Method for Producing the Conductive Paste for Positive Electrodes of Lithium-Ion Batteries of the Present Invention In the second embodiment of present invention, the total solids content of the dispersants (A) and (D) in the solids content of the conductive paste for positive electrodes of lithium-ion batteries of the present invention is usually 30 mass % or less, and preferably 20 mass % or less, in view of the viscosity at the time that the pigment is dispersed, as well as pigment dispersibility, dispersion stability, and production efficiency. Further, in a preferable embodiment of the present invention, from the viewpoint of the conductivity of a coating film, the total solids content of the dispersants (A) and (D) in the solids content of the conductive paste for positive electrodes of lithium-ion batteries of the present invention is usually 20 mass % or less, preferably 0.1 to 15 mass %, and more preferably 1.0 to 10 mass %. Additionally, in the conductive paste for positive electrodes of lithium-ion batteries of the present invention, the amount ratio of the dispersant (A) to the dispersant (D) is usually within a range of 99.9/0.1 to 10.0/90.0, and preferably 95.0/5.0 to 40.0/60.0, based on the resin solids content.

The solids content of the conductive carbon (B) in the solids content of the conductive paste for positive electrodes of lithium-ion batteries of the present invention is usually 50 mass % or more and less than 100 mass %, preferably 60 mass % or more and less than 100 mass %, and more preferably 70 mass % or more and less than 100 mass %, in view of the battery performance. Further, the amount of the solvent (C) contained in the conductive paste for positive electrodes of lithium-ion batteries of the present invention is usually 50 mass % or more and less than 100 mass %, preferably 70 mass % or more and less than 100 mass %, and more preferably 80 mass % or more and less than 100 mass %, in view of the drying efficiency and paste viscosity.

The conductive paste for positive electrodes of lithium-ion batteries of the present invention may be produced by uniformly mixing and dispersing each component described above by using, for example, a known dispersion device, such as a paint shaker, a sand mill, a ball mill, a pebble mill, an LMZ mill, a DCP pearl mill, a planetary ball mill, a homogenizer, a twin-screw kneader, and a thin-film spin system high-speed mixer.

As described later, the conductive paste for positive electrodes of lithium-ion batteries of the present invention may be used to produce a mixture paste for positive electrodes of lithium-ion batteries by being mixed with an electrode active material.

Mixture Paste for Positive Electrodes of Lithium-Ion Batteries

The present invention further provides a mixture paste for positive electrodes of lithium-ion batteries obtained by further mixing an electrode active material with the above conductive paste.

Electrode Active Material

Examples of electrode active materials include lithium nickel oxide ($LiNiO_2$), lithium manganese oxide ($LiMn_2O_4$), lithium cobalt oxide ($LiCoO_2$), lithium composite oxides, such as $LiNi_{1/3}Co_{1/3}Mn_{1/3}O_2$, and the like. These electrode active materials may be used alone, or in a combination of two or more. The solids content of the electrode active material in the solids content of the mixture paste for positive electrodes of lithium-ion batteries of the present invention is usually 70 mass % or more and less than 100 mass %, and preferably 80 mass % or more and less than 100 mass %, in view of the battery capacity and battery resistance.

Method for Producing a Mixture Paste for Positive Electrodes of Lithium-Ion Batteries The mixture paste for positive electrodes of lithium-ion batteries of the present invention may be obtained by first preparing the conductive paste for positive electrodes of lithium-ion batteries described above, and then mixing an electrode active material with the conductive paste. The mixture paste for positive electrodes of lithium-ion batteries of the present invention may also be prepared by mixing the above-described component (A), component (B), component (C), and an electrode active material, and optionally the component (D).

The solids content of the dispersion resin (A) (the total solids content of the dispersant (A) and dispersant (D) in an embodiment that also uses the dispersant (D)) in the solids content of the mixture paste for positive electrodes of lithium-ion batteries of the present invention is usually 0.001 to 20 mass %, and preferably 0.005 to 10 mass %, in view of the battery performance and the paste viscosity. Further, in an embodiment that uses the dispersant (D), the amount ratio of the dispersant (A) to the dispersant (D) in the mixture paste for positive electrodes of lithium-ion batteries of the present invention is usually within a range of 99.9/0.1 to 10.0/90.0, and preferably 95.0/5.0 to 40.0/60.0, based on the resin solids content.

The solids content of the conductive carbon (B) in the solids content of the mixture paste for positive electrodes of lithium-ion batteries of the present invention is usually 0.01 to 30 mass %, preferably 0.05 to 20 mass %, and more preferably 0.1 to 15 mass %, in view of battery performance. Further, the amount of the solvent (C) contained in the mixture paste for positive electrodes of lithium-ion batteries of the present invention is usually 0.1 to 60 mass %, preferably 0.5 to 50 mass %, and more preferably 1 to 45 mass %, in view of electrode drying efficiency and paste viscosity.

As described above, a positive electrode mixture layer of a lithium-ion secondary battery may be produced by applying a mixture paste for positive electrodes of lithium-ion batteries to a surface of a positive electrode core, followed by drying. The paste of the present invention is used to form a mixture layer; in addition, it may also be used to form a primer layer between a positive electrode core and a mixture layer. The mixture paste for positive electrodes of lithium-ion batteries may be applied by using a known method that uses a die coater. The amount of the mixture paste for positive electrodes of lithium-ion batteries to be applied is not particularly limited. For example, the amount may be determined to achieve a thickness of the positive electrode mixture layer after drying of 0.04 to 0.30 mm, and preferably 0.06 to 0.24 mm. The temperature of the drying step may be suitably determined, for example, within a range of 80 to 200° C., and preferably 100 to 180° C. The time for the drying step may be suitably determined, for example, within a range of 5 to 120 seconds, and preferably from 5 to 60 seconds.

The present invention is described in more detail below with reference to Examples. However, the present invention is not limited to these specific embodiments.

EXAMPLES

The present invention is described in more detail below with reference to Production Examples, Examples, and Comparative Examples. However, the present invention is not limited to these Examples. In the following Examples, parts and percentages (%) are by mass.
Production of Dispersion Resin Production Example 1a Production of Dispersion Resin Three hundred parts of propylene glycol monomethyl ether was placed in a reactor equipped with a stirrer, a heater, and a condenser tube. After replacing the air with nitrogen gas, the reactor was maintained at 110° C. The following Monomer Mixture and 200 parts of MPEG2000 (trade name; produced by Nippon Oil & Fats Co., Ltd.; polyoxyethylene glycol monomethyl ether; number average molecular weight:about 2000; active ingredient: 50%; separately added dropwise since MPEG2000 does not dissolve with other monomers) were added thereto dropwise over 3 hours.

| Monomer Mixture | |
|---|---|
| 9-anthracenyl methyl methacrylate | 300 parts |
| styrene | 200 parts |
| n-butyl methacrylate | 200 parts |
| 2-ethylhexyl acrylate | 100 parts |
| 2-hydroxyethyl methacrylate | 100 parts |
| 2,2'-azobis(2-methylbutyronitrile) | 40 parts |

One hour after the completion of the dropwise addition, a solution obtained by dissolving 5 parts of 2,2'-azobis(2-methylbutyronitrile) in 100 parts of propylene glycol monomethyl ether was added thereto dropwise over 1 hour. After the completion of the dropwise addition, the resulting product was maintained at 110° C. for another 1 hour and adjusted with methyl isobutyl ketone to obtain Dispersion resin A-1a solution with a solids content of 70%. Dispersion resin A-1a had a weight average molecular weight of 10,000.

Production Examples 2a to 24a

Production of Dispersion Resin

Dispersion resin A-2a to A-24a solutions were produced by using the same composition and the same production method of Production Example 1a, except that the types and amounts of the monomer composition of Production Example 1a were changed as shown in the following Table 1.

TABLE 1

| | | Production Example | | | | | | | | | |
|---|---|---|---|---|---|---|---|---|---|---|---|
| | | 1a | 2a | 3a | 4a | 5a | 6a | 7a | 8a | 9a | 10a |
| Name of dispersion resin (A) | | A-1a | A-2a | A-3a | A-4a | A-5a | A-6a | A-7a | A-8a | A-9a | A-10a |
| Dispersion resin (A) monomer | 9-anthracenyl methyl methacrylate | 300 | | | | | | | | | |
| | 1-vinylnaphthalene | | 300 | | | | | | | | |
| | 1-naphthylethyl acrylate | | | 300 | | | | | | | |
| | 4-methoxy-1-naphthyl methacrylate | | | | 300 | | | | | | |
| | 4-hydroxy-1-naphthyl methacrylate | | | | | 300 | | | | | |
| | 4-ethoxy-1-naphthyl acrylate | | | | | | 300 | | | | |
| | 4-ethyl-1-naphthyl methacrylate | | | | | | | 300 | | | |
| | 2-sulfonamide-4-hydroxy-1-naphthyl acrylate | | | | | | | | 300 | | |
| | 2-methoxy-4-hydroxy-1-naphthyl acrylate | | | | | | | | | 300 | |
| | 4-methoxycarbonyloxy-1-naphthyl methacrylate | | | | | | | | | | 300 |
| | 2-methoxy-4-phenoxycarbonyloxy-1-naphthyl acrylate | | | | | | | | | | |
| | styrene | 200 | 200 | 200 | 200 | 200 | 200 | 200 | 200 | 200 | 200 |
| | n-butyl acrylate | 200 | 200 | 200 | 200 | 200 | 200 | 200 | 200 | 200 | 200 |
| | 2-ethylhexyl acrylate | 100 | 100 | 100 | 100 | 100 | 100 | 100 | 100 | 100 | 100 |
| | 2-hydroxyethyl acrylate | 100 | 100 | 100 | 100 | 100 | 100 | 100 | 100 | 100 | 100 |
| | MPEG2000 | 100 | 100 | 100 | 100 | 100 | 100 | 100 | 100 | 100 | 100 |
| | N,N-dimethylacrylamide | | | | | | | | | | |
| | N-hydroxyethylacrylamide | | | | | | | | | | |
| | N-hydroxybutylacrylamide | | | | | | | | | | |
| | N-ethyl-N-hydroxyethylacrylamide | | | | | | | | | | |
| | N,N-dihydroxyethylacrylamide | | | | | | | | | | |
| | N,N-dihydroxybutylacrylamide | | | | | | | | | | |
| | N-[tris(hydroxymethyl)methyl]acrylamide | | | | | | | | | | |

TABLE 1-continued

| | | Production Example | | | | | | |
|---|---|---|---|---|---|---|---|---|
| | | 11a | 12a | 13a | 14a | 15a | 16a | 17a |
| Name of dispersion resin (A) | | A-11a | A-12a | A-13a | A-14a | A-15a | A-16a | A-17a |
| Dispersion resin (A) monomer | 9-anthracenyl methyl methacrylate | | | | | | | |
| | 1-vinylnaphthalene | | | | | | | |
| | 1-naphthylethyl acrylate | | | | | | | |
| | 4-methoxy-1-naphthyl methacrylate | | | | | | | |
| | 4-hydroxy-1-naphthyl methacrylate | | | | | | | 300 |
| | 4-ethoxy-1-naphthyl acrylate | | | | | | 300 | |
| | 4-ethyl-1-naphthyl methacrylate | | | | | | | |
| | 2-sulfonamide-4-hydroxy-1-naphthyl acrylate | | | | | | | |
| | 2-methoxy-4-hydroxy-1-naphthyl acrylate | | | | 300 | 300 | | |
| | 4-methoxycarbonyloxy-1-naphthyl methacrylate | | | | | | | |
| | 2-methoxy-4-phenoxycarbonyloxy-1-naphthyl acrylate | 300 | 50 | 600 | | | | |
| | styrene | 200 | 400 | 50 | 100 | 100 | 100 | 100 |
| | n-butyl acrylate | 200 | 250 | 50 | 100 | 100 | 100 | 100 |
| | 2-ethylhexyl acrylate | 100 | 100 | 100 | 100 | 100 | 100 | 100 |
| | 2-hydroxyethyl acrylate | 100 | 100 | 100 | 100 | 100 | 100 | 100 |
| | MPEG2000 | 100 | 100 | 100 | 100 | 100 | 100 | 100 |
| | N,N-dimethylacrylamide | | | | 200 | | | |
| | N-hydroxyethylacrylamide | | | | | 200 | | |
| | N-hydroxybutylacrylamide | | | | | | 200 | |
| | N-ethyl-N-hydroxyethylacrylamide | | | | | | | 200 |
| | N,N-dihydroxyethylacrylamide | | | | | | | |
| | N,N-dihydroxybutylacrylamide | | | | | | | |
| | N-[tris(hydroxymethyl)methyl]acrylamide | | | | | | | |

| | | Production Example | | | | | | |
|---|---|---|---|---|---|---|---|---|
| | | 18a | 19a | 20a | 21a | 22a | 23a | 24a |
| Name of dispersion resin (A) | | A-18a | A-19a | A-20a | A-21a | A-22a | A-23a | A-24a |
| Dispersion resin (A) monomer | 9-anthracenyl methyl methacrylate | | | | | | | |
| | 1-vinylnaphthalene | | | | | | | |
| | 1-naphthylethyl acrylate | | | | | | | |
| | 4-methoxy-1-naphthyl methacrylate | | | | | | | |
| | 4-hydroxy-1-naphthyl methacrylate | | | | | | | |
| | 4-ethoxy-1-naphthyl acrylate | | | | | | | |
| | 4-ethyl-1-naphthyl methacrylate | | | | | | | |
| | 2-sulfonamide-4-hydroxy-1-naphthyl acrylate | | 300 | | | | | |
| | 2-methoxy-4-hydroxy-1-naphthyl acrylate | | | | | | | |
| | 4-methoxycarbonyloxy-1-naphthyl methacrylate | 300 | | 300 | | | | |
| | 2-methoxy-4-phenoxycarbonyloxy-1-naphthyl acrylate | | | | 300 | 300 | 300 | |
| | styrene | 100 | 100 | 100 | 100 | 100 | 100 | 500 |
| | n-butyl acrylate | 100 | 100 | 100 | 100 | 100 | 100 | 200 |
| | 2-ethylhexyl acrylate | 100 | 100 | 100 | 100 | 100 | 100 | 100 |
| | 2-hydroxyethyl acrylate | 100 | 100 | 100 | 100 | 100 | 100 | 100 |
| | MPEG2000 | 100 | 100 | 100 | 100 | 100 | 100 | 100 |
| | N,N-dimethylacrylamide | | | | | | | |
| | N-hydroxyethylacrylamide | | | | | | | |
| | N-hydroxybutylacrylamide | | | | | | | |
| | N-ethyl-N-hydroxyethylacrylamide | | | | | 200 | 200 | |
| | N,N-dihydroxyethylacrylamide | 200 | | | | | | |
| | N,N-dihydroxybutylacrylamide | | | 200 | | | | |
| | N-[tris(hydroxymethyl)methyl]acrylamide | | | | 200 | 200 | | |

The monomer amounts shown in the table are active ingredient values.

Conductive Paste Production I

Example 1a

Forty-three parts (solids content: 30 parts) of Dispersion resin A-1a obtained in Production Example 1a, 1200 parts of acetylene black, 220 parts of KF polymer W#7300 (trade name, polyvinylidene fluoride, produced by Kureha Corporation), and 8500 parts of N-methyl-2-pyrrolidone were mixed and dispersed using a ball mill for 5 hours to obtain Conductive paste X-1a.

Examples 2a to 26a and Comparative Examples 1a to 2a

Conductive pastes X-2 to X-28 were produced as in Example 1, except that the composition of the conductive paste was changed as shown in the following Table 2. The amounts shown in the table are based on a solids content.

TABLE 2

| | | Examples and Comparative Examples Ex. | | | | | | | | | | | |
|---|---|---|---|---|---|---|---|---|---|---|---|---|
| | | 1a | 2a | 3a | 4a | 5a | 6a | 7a | 8a | 9a | 10a | 11a | 12a |
| Name of conductive paste | | X-1a | X-2a | X-3a | X-4a | X-5a | X-6a | X-7a | X-8a | X-9a | X-10a | X-11a | X-12a |
| Dispersion resin (A) Type | | A-1a | A-2a | A-3a | A-4a | A-5a | A-6a | A-7a | A-8a | A-9a | A-10a | A-11a | A-12a |
| Dispersion resin (A) Amount | | 30 | 30 | 30 | 30 | 30 | 30 | 30 | 30 | 30 | 30 | 30 | 30 |
| Polyvinyl alcohol resin (Note 1a) Amount | | | | | | | | | | | | | |
| Polyvinylidene fluoride | | 220 | 220 | 220 | 220 | 220 | 220 | 220 | 220 | 220 | 220 | 220 | 220 |
| Acidic compound | Diphosphorus pentoxide | | | | | | | | | | | | |
| | Acetic anhydride | | | | | | | | | | | | |
| | Methanesulfonic acid anhydride | | | | | | | | | | | | |
| Conductive carbon (B) | Acetylene black | 1200 | 1200 | 1200 | 1200 | 1200 | 1200 | 1200 | 1200 | 1200 | 1200 | 1200 | 1200 |
| | Graphite | | | | | | | | | | | | |
| Solvent (C) | N-methyl-2-pyrrolidone | 8500 | 8500 | 8500 | 8500 | 8500 | 8500 | 8500 | 8500 | 8500 | 8500 | 8500 | 8500 |

| | | Examples and Comparative Examples Ex. | | | | | | | |
|---|---|---|---|---|---|---|---|---|---|
| | | 13a | 14a | 15a | 16a | 17a | 18a | 19a | 20a |
| Name of conductive paste | | X-13a | X-14a | X-15a | X-16a | X-17a | X-18a | X-19a | X-20a |
| Dispersion resin (A) Type | | A-13a | A-14a | A-15a | A-16a | A-17a | A-18a | A-19a | A-20a |
| Dispersion resin (A) Amount | | 30 | 30 | 30 | 30 | 30 | 30 | 30 | 30 |
| Polyvinyl alcohol resin (Note 1a) Amount | | | | | | | | | |
| Polyvinylidene fluoride | | 220 | 220 | 220 | 220 | 220 | 220 | 220 | 220 |
| Acidic compound | Diphosphorus pentoxide | | | | | | | | |
| | Acetic anhydride | | | | | | | | |
| | Methanesulfonic acid anhydride | | | | | | | | |
| Conductive carbon (B) | Acetylene black | 1200 | 1200 | 1200 | 1200 | 1200 | 1200 | 1200 | 1200 |
| | Graphite | | | | | | | | |
| Solvent (C) | N-methyl-2-pyrrolidone | 8500 | 8500 | 8500 | 8500 | 8500 | 8500 | 8500 | 8500 |

| | | Examples and Comparative Examples | | | | | | | |
|---|---|---|---|---|---|---|---|---|---|
| | | Ex. | | | | | | Comp. Ex. | |
| | | 21a | 22a | 23a | 24a | 25a | 26a | 1a | 2a |
| Name of conductive paste | | X-21a | X-22a | X-23a | X-24a | X-25a | X-26a | X-27a | X-28a |
| Dispersion resin (A) Type | | A-21a | A-22a | A-23a | A-24a | A-25a | A-26a | A-24a | |
| Dispersion resin (A) Amount | | 30 | 30 | 30 | 30 | 30 | 30 | 30 | |
| Polyvinyl alcohol resin (Note 1a) Amount | | | | | | | | | 30 |
| Polyvinylidene fluoride | | 220 | 220 | 220 | 220 | 220 | 220 | 220 | 220 |
| Acidic compound | Diphosphorus pentoxide | | | | 3 | | | | |
| | Acetic anhydride | | | | | 3 | | | |
| | Methanesulfonic acid anhydride | | | | | | 3 | | |
| Conductive carbon (B) | Acetylene black | 1200 | 600 | | 1200 | 1200 | 1200 | 1200 | 1200 |
| | Graphite | | 600 | 1200 | | | | | |
| Solvent (C) | N-methyl-2-pyrrolidone | 8500 | 8500 | 8500 | 8500 | 8500 | 8500 | 8500 | 8500 |

(Note 1a)
Polyvinyl alcohol resin - saponification degree: 80 mol %; average polymerization degree: 500

Mixture Paste Production I

Example 27a

Eight parts of Conductive paste X-1a obtained in Example 1a, 90 parts of active material particles (lithium-nickel manganese oxide particles with spinel structure represented by the compositional formula: $LiNi_{0.5}Mn_{1.5}O_4$; average particle diameter: 6 μm; BET specific surface area: 0.7 m$^2$/g), and 57 parts of N-methyl-2-pyrrolidone were mixed to produce Mixture paste Y-1a.

Examples 28a to 52a and Comparative Examples 3a to 4a

Mixture pastes Y-2a to Y-28a were produced as in Example 27a, except that the type of the conductive paste was changed as shown in the following Table 3.

Table 3 below shows the results of evaluation tests mentioned later (viscosity of conductive paste and battery performance (IV resistance increase rate)). If the results of at least one of the two evaluation tests were "fail," then the conductive paste and mixture paste were considered as "fail."

Conductive Pastes and Mixture Pastes Used as Blank Samples" section below. Then, lithium-ion secondary batteries each comprising a positive electrode and a negative electrode were constructed in accordance with the methods described in the "Production of Positive Electrode," "Production of Negative Electrode," and "Construction of Lithium-Ion Secondary Battery" sections below. Subsequently, the IV resistance was measured using the obtained lithium-ion secondary batteries in accordance with the "IV Resistance Measurement Method" below.

(2) Lithium-ion secondary batteries each comprising a positive electrode and a negative electrode were constructed as in (1) above, except that Mixture pastes Y-1a to Y-25a obtained in the Examples and Comparative Examples were used in place of the mixture pastes prepared as blank samples. Then, the IV resistance was measured. Subsequently, the IV resistance increase rates (%) were calculated with respect to the blank samples, and evaluated. Since three different types of conductive carbon (acetylene black alone, a combination of acetylene black and graphite, and graphite alone) were used, a comparison was made with respect to blank samples of the same type of pigment (mixture paste Y-22a was evaluated in comparison with a blank sample of

TABLE 3

| | | Examples and Comparative Examples Ex. | | | | | | | | | | | | | |
|---|---|---|---|---|---|---|---|---|---|---|---|---|---|---|---|
| | | 27a | 28a | 29a | 30a | 31a | 32a | 33a | 34a | 35a | 36a | 37a | 38a | 39a | 40a | 41a |
| Name of mixture paste | | Y-1a | Y-2a | Y-3a | Y-4a | Y-5a | Y-6a | Y-7a | Y-8a | Y-9a | Y-10a | Y-11a | Y-12a | Y-13a | Y-14a | Y-15a |
| Name of conductive paste | | X-1a | X-2a | X-3a | X-4a | X-5a | X-6a | X-7a | X-8a | X-9a | X-10a | X-11a | X-12a | X-13a | X-14a | X-15a |
| Test results | Viscosity | C | C | C | B | B | B | B | B | B | B | B | C | C | A | A |
| | Battery performance | B | B | A | A | A | A | A | A | A | A | A | A | A | A | S |

| | | Examples and Comparative Examples | | | | | | | | | | | Comp. Ex. | |
|---|---|---|---|---|---|---|---|---|---|---|---|---|---|---|
| | | Ex. | | | | | | | | | | | | |
| | | 42a | 43a | 44a | 45a | 46a | 47a | 48a | 49a | 50a | 51a | 52a | 3a | 4a |
| Name of mixture paste | | Y-16a | Y-17a | Y-18a | Y-19a | Y-20a | Y-21a | Y-22a | Y-23a | Y-24a | Y-25a | Y-26a | Y-27a | Y-28a |
| Name of conductive paste | | X-16a | X-17a | X-18a | X-19a | X-20a | X-21a | X-22a | X-23a | X-24a | X-25a | X-26a | X-27a | X-28a |
| Test results | Viscosity | A | A | A | A | A | A | A | C | A | A | A | D | D |
| | Battery performance | S | S | S | S | S | S | A | B | S | S | S | B | C |

Evaluation Test I

Viscosity

The viscosity of the conductive pastes obtained in the Examples was measured using a cone and plate viscometer Mars2 (trade name, produced by Haake) at a shear rate of 1.0 sec$^{-1}$, and evaluated according to the following criteria. As the evaluation, A, B, and C were pass, and D was fail.
A: the viscosity was less than 5 Pa·s
B: the viscosity was 5 Pa·s or more and less than 30 Pa·s
C: the viscosity was 30 Pa·s or more and less than 100 Pa·s
D: the viscosity was 100 Pa·s or more Battery Performance (IV Resistance Increase Rate)

The battery performance (IV resistance increase rate) was evaluated using Mixture pastes Y-1a to Y-28a obtained in Examples 27a to 52a, and Comparative Examples 3a and 4a. The evaluation method was performed in accordance with the following procedure.

(1) Conductive pastes and mixture pastes were produced in accordance with the method described in the "Production of 600 parts of acetylene black and 600 parts of graphite, mixture paste Y-23a was evaluated in comparison with a blank sample of 1200 parts of graphite, and other mixture pastes were evaluated in comparison with a blank sample of 1200 parts of acetylene black).

The battery performance (IV resistance increase rate) was evaluated in accordance with the following criteria. S, A, and B were evaluated as "pass," and C was evaluated as "fail."

S: the IV resistance increase rate was less than +3.5%, compared with the blank sample A: the IV resistance increase rate was +3.5% or more and less than +5%, compared with the blank sample B: the IV resistance increase rate was +5% or more and less than +8%, compared with the blank sample C: the IV resistance increase rate was +8% or more, compared with the blank sample Production of Conductive Pastes and Mixture Pastes Used as Blank Samples One thousand and two hundred parts of acetylene black, 220 parts of KS polymer W#7300 (trade name, polyvinylidene fluoride, produced by Kureha Corporation), and 8500 parts of N-methyl-2-pyrrolidone were mixed and dispersed using a ball mill for 5 hours to obtain a dispersant-free conductive paste.

Eight parts of the conductive paste obtained above, 90 parts of active material particles (lithium-nickel manganese oxide particles with spinel structure represented by the compositional formula: $LiNi_{0.5}Mn_{1.5}O_4$; average particle diameter: 6 μm; BET specific surface area: 0.7 m$^2$/g), and 57 parts of N-methyl-2-pyrrolidone were mixed to obtain a dispersant-free mixture paste to be used as a blank sample. Additionally, blank samples were produced using 600 parts of acetylene black and 600 parts of graphite, or 1200 parts of graphite, in place of 1200 parts of acetylene black (three types of blank samples were produced: acetylene black alone, a combination of acetylene black and graphite, and graphite alone).

Production of Positive Electrode

The mixture paste was applied to both surfaces of an elongated aluminum foil having an average thickness of about 15 μm (positive electrode collector) in an amount of 10 mg/cm$^2$ (based on solids content) per one surface by a roller coating method to form a strip, and dried (at a drying temperature of 80° C. for 1 minute) to form a positive-electrode-active-material layer. The positive-electrode-active-material layer supported on the positive electrode collector was pressed using a roll press, thereby adjusting the properties.

Production of Negative Electrode

A natural graphite powder (C, average particle diameter: 5 μm; specific surface area: 3 m$^2$/g) as a negative electrode active material, a styrene-butadiene rubber (SBR) as a binder, and carboxymethyl cellulose (CMC) as a thickener were mixed with ion exchanged water, so that the mass ratio of these materials was C:SBR:CMC=98:1:1, and the solids concentration was about 45 mass %, thereby preparing a slurry for forming a negative-electrode-active-material layer. This slurry was applied to both surfaces of an elongated copper foil having an average thickness of about 10 μm (negative electrode collector) in an amount of 7 mg/cm$^2$ (based on solids content) per one surface by a roller coating method to form a strip, and dried (at a drying temperature of 120° C. for 1 minute) to form a negative-electrode-active-material layer. The resulting product was pressed using a roll press, thereby adjusting the properties.

Construction of Lithium-Ion Secondary Battery

The positive electrode sheet and the negative electrode sheet produced above were disposed facing each other via a separator sheet (a three-layered structure with a thickness of 20 μm in which polypropylene (PP) is laminated on both surfaces of polyethylene (PE)), and elliptically wound to prepare a wound electrode body. The produced electrode body was disposed in a cylindrical battery case, to which a non-aqueous electrolyte solution (obtained by dissolving $LiPF_6$ as a supporting salt at a concentration of 1.0 mol/L in a mixed solvent containing ethylene carbonate (EC), dimethyl carbonate (DMC), and ethylmethyl carbonate (EMC) at a volume ratio of EC:DMC:EMC=3:4:3) was introduced. Then, a positive-electrode terminal and a negative-electrode terminal were welded to the positive electrode collector and negative electrode collector exposed at the end of the electrode body, and the battery case was sealed to construct a 18650-type lithium-ion secondary battery.

IV Resistance Measurement Method

The IV resistance of a cell for evaluation with a state-of-charge (SOC) of 60% was measured in an environment at −30° C. The IV resistance here was measured as below: a constant current discharge at a previously determined electric current value (I) was performed for 10 seconds, and a voltage (V) after the current discharge was measured. The previously determined electric current values (I) were plotted on the X-axis while the voltage (V) after each current discharge was plotted on the Y-axis. Then, an approximate straight line was drawn based on the plot obtained by each current discharge, and its slope was considered as the IV resistance. The IV resistance (mΩ) here was calculated based on the voltages (V) obtained after discharges at constant current values of 0.3 C, 1 C, and 3 C.

Production of Resin for Pigment Dispersion

Production Example 1b

Production of Resin for Pigment Dispersion

Dispersion resin A-1a to A-24a solutions with a solids content of 70% obtained in accordance with the method described in the "Production of Dispersion Resin" section above were used as Pigment dispersion resin A-1b to A-24b solutions.

Conductive Paste Production II

Example 1b

Twenty-one parts (solids content: 15 parts) of Pigment dispersion resin A-1b solution obtained in Production Example 1b, 15 parts of PVA-1 (Note 1), 1200 parts of acetylene black, 220 parts of KF polymer W#7300 (trade name, polyvinylidene fluoride, produced by Kureha Corporation), and 8500 parts of N-methyl-2-pyrrolidone were mixed and dispersed using a ball mill for 5 hours to obtain Conductive paste X-1b.

Examples 2b to 30b and Comparative Examples 1b to 3b

Conductive pastes X-2b to X-33b were produced as in Example 1b, except that the amount of the conductive paste was changed as shown in the following Table 4. The amount of the resin in the table is based on solids content.

TABLE 4

| | Examples and Comparative Examples Ex. | | | | | | | | | | | | |
|---|---|---|---|---|---|---|---|---|---|---|---|---|---|
| | 1b | 2b | 3b | 4b | 5b | 6b | 7b | 8b | 9b | 10b | 11b | 12b | 13b |
| Name of conductive paste | X-1b | X-2b | X-3b | X-4b | X-5b | X-6b | X-7b | X-8b | X-9b | X-10b | X-11b | X-12b | X-13b |
| Dispersion resin (A) Type | A-1b | A-2b | A-3b | A-4b | A-5b | A-6b | A-7b | A-8b | A-9b | A-10b | A-11b | A-12b | A-13b |
| Dispersion resin (A) Amount | 15 | 15 | 15 | 15 | 15 | 15 | 15 | 15 | 15 | 15 | 15 | 15 | 15 |

TABLE 4-continued

| Dispersant (B) | PVA-1 (Note1b) Amount | 15 | 15 | 15 | 15 | 15 | 15 | 15 | 15 | 15 | 15 | 15 | 15 | 15 |
|---|---|---|---|---|---|---|---|---|---|---|---|---|---|---|
| | PVA-2 (Note 2b) Amount | | | | | | | | | | | | | |
| Polyvinylidene fluoride | | 220 | 220 | 220 | 220 | 220 | 220 | 220 | 220 | 220 | 220 | 220 | 220 | 220 |
| Acidic compound | Diphosphorus pentoxide | | | | | | | | | | | | | |
| | Acetic anhydride | | | | | | | | | | | | | |
| | Methanesulfonic acid anhydride | | | | | | | | | | | | | |
| Conductive carbon (B) | Acetylene black | 1200 | 1200 | 1200 | 1200 | 1200 | 1200 | 1200 | 1200 | 1200 | 1200 | 1200 | 1200 | 1200 |
| | Graphite | | | | | | | | | | | | | |
| Solvent (C) | N-methyl-2-pyrrolidone | 8500 | 8500 | 8500 | 8500 | 8500 | 8500 | 8500 | 8500 | 8500 | 8500 | 8500 | 8500 | 8500 |

Examples and Comparative Examples

| | | Ex. 14b | 15b | 16b | 17b | 18b | 19b | 20b | 21b | 22b | 23b |
|---|---|---|---|---|---|---|---|---|---|---|---|
| Name of conductive paste | | X-14b | X-15b | X-16b | X-17b | X-18b | X-19b | X-20b | X-21b | X-22b | X-23b |
| Dispersion resin (A) Type | | A-14b | A-15b | A-16b | A-17b | A-18b | A-19b | A-20b | A-21b | A-22b | A-23b |
| Dispersion resin (A) Amount | | 15 | 15 | 15 | 15 | 15 | 15 | 15 | 15 | 15 | 15 |
| Dispersant (B) | PVA-1 (Note1b) Amount | 15 | 15 | 15 | 15 | 15 | 15 | 15 | 15 | 15 | 15 |
| | PVA-2 (Note 2b) Amount | | | | | | | | | | |
| Polyvinylidene fluoride | | 220 | 220 | 220 | 220 | 220 | 220 | 220 | 220 | 220 | 220 |
| Acidic compound | Diphosphorus pentoxide | | | | | | | | | | |
| | Acetic anhydride | | | | | | | | | | |
| | Methanesulfonic acid anhydride | | | | | | | | | | |
| Conductive carbon (B) | Acetylene black | 1200 | 1200 | 1200 | 1200 | 1200 | 1200 | 1200 | 1200 | 600 | |
| | Graphite | | | | | | | | | 600 | 1200 |
| Solvent (C) | N-methyl-2-pyrrolidone | 8500 | 8500 | 8500 | 8500 | 8500 | 8500 | 8500 | 8500 | 8500 | 8500 |

Examples and Comparative Examples

| | | Ex. | | | | | | | Comp. Ex | | |
|---|---|---|---|---|---|---|---|---|---|---|---|
| | | 24b | 25b | 26b | 27b | 28b | 29b | 30b | 1b | 2b | 3b |
| Name of conductive paste | | X-24b | X-25b | X-26b | X-27b | X-28b | X-29b | X-30b | X-31b | X-32b | X-33b |
| Dispersion resin (A) Type | | A-15b | A-17b | A-19b | A-15b | A-17b | A-19b | A-15b | A-17b | A-19b | A-24b |
| Dispersion resin (A) Amount | | 15 | 15 | 15 | 22.5 | 22.5 | 22.5 | 22.5 | 15 | | |
| Dispersant (B) | PVA-1 (Note1b) Amount | 15 | 15 | 15 | 7.5 | 7.5 | 7.5 | 7.5 | 15 | | 30 |
| | PVA-2 (Note 2b) Amount | | | | | | | | | 30 | |
| Polyvinylidene fluoride | | 220 | 220 | 220 | 220 | 220 | 220 | 220 | 220 | 220 | 220 |
| Acidic compound | Diphosphorus pentoxide | 3 | | | | 3 | | | | | |
| | Acetic anhydride | | 3 | | | | 3 | | | | |
| | Methanesulfonic acid anhydride | | | 3 | | | | 3 | | | |
| Conductive carbon (B) | Acetylene black | 1200 | 1200 | 1200 | 1200 | 1200 | 1200 | 1200 | 1200 | 1200 | 1200 |
| | Graphite | | | | | | | | | | |
| Solvent (C) | N-methyl-2-pyrrolidone | 8500 | 8500 | 8500 | 8500 | 8500 | 8500 | 8500 | 8500 | 8500 | 8500 |

(Note 1b) PVA-1: polyvinyl alcohol resin; saponification degree: 80 mol %; average polymerization degree: about 500; and the ratio of repeating unit —(CH2-CH(OH))—: about 67 mass %

(Note 2b) PVA-2: polyvinyl alcohol resin; saponification degree: 35 mol %; average polymerization degree: about 1500; and the ratio of repeating unit —(CH2-CH(OH))—: about 22 mass %

Mixture Paste Production II

Example 31b

Eight parts of the conductive paste X-1b obtained in Example 1b, 90 parts of active material particles (lithium-nickel manganese oxide particles with spinel structure represented by the compositional formula: $LiNi_{0.5}Mn_{1.5}O_4$; average particle diameter: 6 μm; BET specific surface area: 0.7 $m^2/g$), and 57 parts of N-methyl-2-pyrrolidone were mixed to produce Mixture paste Y-1b.

Examples 32b to 60b and Comparative Examples 4b to 6b

Mixture pastes Y-2b to Y-33b were produced as in Example 31b, except that the type of the conductive paste was changed as shown in the following Table 3.

Table 5 below shows the results of evaluation tests mentioned later (viscosity of conductive paste and battery performance). If the results of at least one of the two evaluation tests were "fail," then the conductive paste and mixture paste were considered as "fail."

TABLE 5

Examples and Comparative Examples

| | Ex. | | | | | | | | | | | | |
|---|---|---|---|---|---|---|---|---|---|---|---|---|---|
| | 31b | 32b | 33b | 34b | 35b | 36b | 37b | 38b | 39b | 40b | 41b | 42b | 43b |
| Name of mixture paste | Y-1b | Y-2b | Y-3b | Y-4b | Y-5b | Y-6b | Y-7b | Y-8b | Y-9b | Y-10b | Y-11b | Y-12b | Y-13b |
| Name of conductive paste | X-1b | X-2b | X-3b | X-4b | X-5b | X-6b | X-7b | X-8b | X-9b | X-10b | X-11b | X-12b | X-13b |

TABLE 5-continued

| Test | Viscosity | B | B | B | A | A | A | A | A | A | A | A | B | B |
|---|---|---|---|---|---|---|---|---|---|---|---|---|---|---|
| results | Battery performance | B | B | A | A | A | A | A | A | A | A | A | A | A |

| | | Examples and Comparative Examples Ex. | | | | | | | | |
|---|---|---|---|---|---|---|---|---|---|---|
| | | 44b | 45b | 46b | 47b | 48b | 49b | 50b | 51b | 52b | 53b |
| Name of mixture paste | | Y-14b | Y-15b | Y-16b | Y-17b | Y-18b | Y-19b | Y-20b | Y-21b | Y-22b | Y-23b |
| Name of conductive paste | | X-14b | X-15b | X-16b | X-17b | X-18b | X-19b | X-20b | X-21b | X-22b | X-23b |
| Test | Viscosity | S | S | S | S | S | S | S | S | S | B |
| results | Battery performance | A | S | S | S | S | S | S | S | A | A |

| | | Examples and Comparative Examples | | | | | | | | | |
|---|---|---|---|---|---|---|---|---|---|---|---|
| | | Ex. | | | | | | | Comp. Ex. | | |
| | | 54b | 55b | 56b | 57b | 58b | 59b | 60b | 4b | 5b | 6b |
| Name of mixture paste | | Y-24b | Y-25b | Y-26b | Y-27b | Y-28b | Y-29b | Y-30b | Y-31b | Y-32b | Y-33b |
| Name of conductive paste | | X-24b | X-25b | X-26b | X-27b | X-28b | X-29b | X-30b | X-31b | X-32b | X-33b |
| Test | Viscosity | S | S | S | S | S | S | S | D | D | D |
| results | Battery performance | S | S | S | S | S | S | S | C | C | C. |

Evaluation Test II

Viscosity

The viscosity of the conductive pastes obtained in the Examples was measured using a cone and plate viscometer Mars2 (trade name, produced by Haake) at a shear rate of 1.0 $sec^{-1}$, and evaluated according to the following criteria. As the evaluation, S, A, B, and C were pass, and D was fail.

S: the viscosity was less than 1 Pa·s
A: the viscosity was 1 Pa·s or more and less than 5 Pa·s
B: the viscosity was 5 Pa·s or more and less than 30 Pa·s
C: the viscosity was 30 Pa·s or more and less than 100 Pa·s
D: the viscosity was 100 Pa·s or more Battery Performance (IV Resistance Increase Rate)

The battery performance (IV resistance increase rate) was evaluated using Mixture pastes Y-1b to Y-33b obtained in Examples 31b to 60b, and Comparative Examples 4b to 6b. The evaluation method was performed in accordance with the following procedure.

(1) Conductive pastes and mixture pastes were produced in accordance with the method described in the "Production of Conductive Pastes and Mixture Pastes Used as Blank Samples" section above in "Evaluation Test I." Then, lithium-ion secondary batteries each comprising a positive electrode and a negative electrode were constructed in accordance with the methods described in the "Production of Positive Electrode," "Production of Negative Electrode," and "Construction of Lithium-Ion Secondary Battery" sections above in "Evaluation Test I." Subsequently, the IV resistance was measured using the obtained lithium-ion secondary batteries in accordance with the "IV Resistance Measurement Method" in "Evaluation Test I."

(2) Lithium-ion secondary batteries each comprising a positive electrode and a negative electrode were constructed as in (1) above, except that Mixture pastes Y-1b to Y-33b obtained in the Examples and Comparative Examples were used in place of the mixture pastes prepared as blank samples. Then, the IV resistance was measured. Subsequently, the IV resistance increase rates (%) were calculated with respect to the blank samples.

Since three different types of conductive carbon (acetylene black alone, a combination of acetylene black and graphite, and graphite alone) were used, a comparison was made with respect to blank samples of the same type of pigment (mixture paste Y-22b was evaluated in comparison with a blank sample of 600 parts of acetylene black and 600 parts of graphite, mixture paste Y-23b was evaluated in comparison with a blank sample of 1200 parts of graphite, and other mixture pastes were evaluated in comparison with a blank sample of 1200 parts of acetylene black).

The battery performance (IV resistance increase rate) was evaluated in accordance with the following criteria. S, A, and B were evaluated as "pass," and C was evaluated as "fail."

S: the IV resistance increase rate was less than +3%, compared with the blank sample
A: the IV resistance increase rate was +3% or more and less than +5%, compared with the blank sample
B: the IV resistance increase rate was +5% or more and less than +8%, compared with the blank sample
C: the IV resistance increase rate was +8% or more, compared with the blank sample

The invention claimed is:

1. A conductive paste comprising a dispersion resin (A), conductive carbon (B), and a solvent (C),
   wherein the dispersion resin (A) is a copolymer of a monomer mixture comprising a polycyclic aromatic hydrocarbon-containing monomer (A-1) in an amount of 1 to 70 mass %, based on the total solids content,
   wherein the conductive paste is capable of constituting a positive electrode of a lithium-ion battery, and
   wherein the polycyclic aromatic hydrocarbon-containing monomer (A-1) is naphthyl(meth)acrylate or a derivative thereof (A-1-3) of the following Formula (3):

Formula (3)

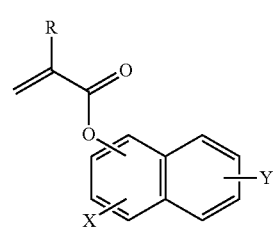

wherein R is hydrogen or methyl, and X and Y is each independently selected from the group consisting of hydrogen, alkyl, alkoxy, alkoxycarbonyloxy, phosphoryloxy, hydroxyl, sulfonic acid, carboxyl, amino, nitro, halogen, aryloxy, alkylthio, and arylthio.

2. The conductive paste according to claim 1, further comprising a dispersant (D),
wherein the dispersant (D) contains a polyvinyl alcohol resin (d1), and
the polyvinyl alcohol resin (d1) has a repeating unit of the following formula:

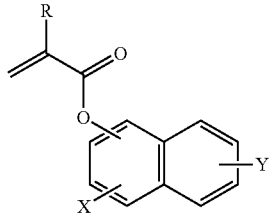

Formula (3)

in a proportion of 30 to 100 mass % in polymer chains.

3. The conductive paste according to claim 1,
wherein the conductive carbon (B) comprises acetylene black.

4. The conductive paste according to claim 1,
wherein the conductive carbon (B) comprises graphite.

5. The conductive paste according to claim 1,
wherein the solvent (C) contains N-methyl-2-pyrrolidone.

6. A mixture paste for positive electrodes of lithium-ion batteries comprising the conductive paste of claim 1, and further comprising an electrode active material.

7. A positive electrode of a lithium-ion battery comprising the mixture paste for positive electrodes of lithium-ion batteries of claim 6.

8. A lithium-ion battery having the positive electrode of claim 7.

* * * * *